(12) United States Patent
Zeng

(10) Patent No.: US 10,712,947 B2
(45) Date of Patent: Jul. 14, 2020

(54) DATA PROCESSING METHOD AND RELATED STORAGE DEVICE

(71) Applicant: Huawei Technologies Co., Ltd., Shenzhen (CN)

(72) Inventor: Haitao Zeng, Huizhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/257,959

(22) Filed: Jan. 25, 2019

(65) Prior Publication Data

US 2019/0155505 A1 May 23, 2019

Related U.S. Application Data

(63) Continuation of application No. PCT/CN2017/081338, filed on Apr. 21, 2017.

(30) Foreign Application Priority Data

Sep. 20, 2016 (CN) .......................... 2016 1 0836101

(51) Int. Cl.
*G06F 3/06* (2006.01)
*H04L 12/741* (2013.01)
(Continued)

(52) U.S. Cl.
CPC .............. *G06F 3/061* (2013.01); *G06F 3/065* (2013.01); *G06F 3/067* (2013.01); *G06F 3/0614* (2013.01);
(Continued)

(58) Field of Classification Search
None
See application file for complete search history.

(56) References Cited

U.S. PATENT DOCUMENTS 6,622,163 B1 9/2003 Tawill et al.
6,954,881 B1 10/2005 Flynn Jr. et al.
(Continued)

FOREIGN PATENT DOCUMENTS

CN 1348134 A 5/2002
CN 102340530 A 2/2012
(Continued)

OTHER PUBLICATIONS

Foreign Communication From a Counterpart Application, European Application No. 17852123.3, Extended European Search Report dated Jun. 13, 2019, 7 pages.
(Continued)

*Primary Examiner* — Michael Alsip
(74) *Attorney, Agent, or Firm* — Conley Rose, P.C.

(57) ABSTRACT

A first storage device receives a first reservation preemption command from a host using a target port. The first reservation preemption command includes a port identifier of the target port, a to-be-checked reservation key, and a logical unit number (LUN). The first storage device encapsulates the to-be-checked reservation key, the LUN, the port identifier of the target port, and a port identifier of the forwarding port to obtain a second reservation preemption command. Further, the first storage device sends the second reservation preemption command to a second storage device using the forwarding port. The second storage device performs a reservation preemption operation based on the port identifier of the target port. When a split brain occurs in a host cluster, data consistency of different storage arrays can be ensured without relying on a Fiber Channel switch, thereby ensuring applicability in more scenarios.

20 Claims, 10 Drawing Sheets

(51) Int. Cl.
*H04L 12/935* (2013.01)
*H04L 12/931* (2013.01)
*H04L 29/12* (2006.01)

(52) U.S. Cl.
CPC .......... *G06F 3/0622* (2013.01); *G06F 3/0637* (2013.01); *G06F 3/0647* (2013.01); *G06F 3/0659* (2013.01); *H04L 45/745* (2013.01); *H04L 49/3009* (2013.01); *H04L 49/357* (2013.01); *H04L 61/6031* (2013.01)

(56) References Cited

U.S. PATENT DOCUMENTS

| | | | | |
|---|---|---|---|---|
| 9,329,794 | B1* | 5/2016 | Shah | G06F 3/0647 |
| 9,454,305 | B1* | 9/2016 | Emralino | G06F 3/0604 |
| 2005/0033888 | A1* | 2/2005 | Qi | G06F 3/0607 |
| | | | | 710/200 |
| 2006/0285550 | A1* | 12/2006 | Do | H04L 67/1097 |
| | | | | 370/443 |
| 2011/0173506 | A1* | 7/2011 | Allen | G06F 3/0605 |
| | | | | 714/49 |
| 2014/0000206 | A1 | 1/2014 | Studebaker et al. | |
| 2014/0040410 | A1* | 2/2014 | McDowell | G06F 3/0617 |
| | | | | 709/212 |

FOREIGN PATENT DOCUMENTS

| | | |
|---|---|---|
| CN | 105446662 A | 3/2016 |
| CN | 105549904 A | 5/2016 |
| CN | 105704187 A | 6/2016 |
| CN | 106484327 A | 3/2017 |
| KR | 20010088346 A | 9/2001 |

OTHER PUBLICATIONS

Machine Translation and Abstract of Chinese Publication No. CN105446662, Mar. 30, 2016, 25 pages.
Machine Translation and Abstract of Chinese Publication No. CN105549904, May 4, 2016, 37 pages.
Machine Translation and Abstract of Chinese Publication No. CN105704187, Jun. 22, 2016, 23 pages.
Machine Translation and Abstract of Chinese Publication No. CN106484327, Mar. 8, 2017, 32 pages.
Machine Translation and Abstract of Chinese Publication No. CN102340530, Feb. 1, 2012, 16 pages.
Foreign Communication From a Counterpart Application, Chinese Application No. 201610836101.1, Chinese Office Action dated Oct. 19, 2018, 7 pages.
Foreign Communication From a Counterpart Application, PCT Application No. PCT/CN2017/081338, English Translation of International Search Report dated Jul. 18, 2017, 2 pages.

* cited by examiner

DATA PROCESSING METHOD AND RELATED STORAGE DEVICE

CROSS-REFERENCE TO RELATED APPLICATIONS

This application is a continuation of International Patent Application No. PCT/CN2017/081338 filed on Apr. 21, 2017, which claims priority to Chinese Patent Application No. 201610836101.1 filed on Sep. 20, 2016. The disclosures of the aforementioned applications are hereby incorporated by reference in their entireties.

TECHNICAL FIELD

The present disclosure relates to the field of storage technologies, and in particular, to a data processing method and a related storage device.

BACKGROUND

In a data processing system including a host cluster and a plurality of storage arrays, if data migration is performed between a new storage array (which is referred to as a first storage array in the following) and an original storage array (which is referred to as a second storage array in the following), the following steps need to be performed in a preparation phase of the data migration, mapping a to-be-migrated logical unit (also referred to as LU) of the second storage array to the first storage array in an LU number (LUN) mapping manner, establishing a virtual LU in the first storage array, and establishing a correspondence between the to-be-migrated LU and the virtual LU, and after the to-be-migrated LU is mapped to a host using the first storage array, the host may obtain, using multipath software, a plurality of paths that are used to access the to-be-migrated LU. Paths may be divided into two types, a first type of path is a path used to directly connect the host to the second storage array, and a second type of path is a path used to connect the host to the second storage array using the first storage array.

When different hosts (for example, a host A and a host B) perform an input/output (I/O) operation on the to-be-migrated LU, if a split-brain phenomenon (for example, communication interruption) occurs between the host A and the host B, the host A and the host B may send a reservation preemption command to the second storage array to seize control of the to-be-migrated LU. In a preemption process, if the host A sends a reservation preemption command to the second storage array, and the host B sends a reservation preemption command to the second storage array using the first storage array, the second storage array receives the reservation preemption command sent by the host A such that the host A preempts the to-be-migrated LU. The first storage array receives the reservation preemption command sent by the host B. If the reservation preemption command is forwarded in an original state to the second storage array, because the second storage array identifies a source of the reservation preemption command based on a delivery port of the first storage array, the second storage array may not implement preemption performed by the host B on the to-be-migrated LU. In addition, the first storage array may implement, based on the reservation preemption command, preemption performed by the host B on the virtual LU in the first storage array. If the two hosts succeed in preemption, when the data migration is performed subsequently, because the to-be-migrated LU and the virtual LU are occupied by different hosts, data in the virtual LU cannot be consistent with data in the to-be-migrated LU when a command of the host A is inconsistent with a command of the host B. Consequently, data in the original storage array cannot be consistent with data in the new storage array.

To ensure consistency of data, an existing reservation preemption method is generally as follows. The first storage array may use an N_Port_ID virtualization (NPIV) function and use a port of the first storage array to perform one-to-one simulation on host ports of each host. As shown in FIG. 1, a world wide name (WWN) of a P10' of the first storage array (designated as storage array D) is set to the WWN of the P10, and a WWN of a P11' is set to the WWN of the P11 of host A. When the first storage array receives a command from a P00 port, the first storage array selects the P10' corresponding to the P10, and forwards, using the P10', the reservation preemption command in an original state to the second storage array (designated as storage array C). The second storage array may determine, based on the WWN of the P10' (that is, the WWN of the P10), that the source of the reservation preemption command is the host A, and then performs an operation of preempting the to-be-migrated LU by the host A.

However, in other approaches, an NPIV technology needs to be implemented based on a Fiber Channel (also referred to as FC) switch. In a networking scenario without the FC switch, the foregoing reservation preemption method cannot be implemented and has a great limitation.

SUMMARY

The present disclosure provides a data processing method and a related storage device in order to ensure that, in a process in which different storage arrays implement online data migration, data consistency of different storage arrays without relying on a Fiber Channel switch when a split brain occurs in a host cluster, thereby ensuring applicability in more scenarios.

According to a first aspect, a data processing method is provided, where the method is applied to a storage area network (SAN), the SAN includes a first storage device and a second storage device, and the second storage device includes an LU, and the LU is identified by a LUN. The data processing method includes sending, by a host, a first reservation preemption command to the first storage device using a target port, determining, by the first storage device based on a preset port mapping relationship, a forwarding port corresponding to the target port after obtaining a port identifier of the target port included in the first reservation preemption command, a to-be-checked reservation key, and the LUN, encapsulating the to-be-checked reservation key, the LUN, the port identifier of the target port, and a port identifier of the forwarding port to obtain a second reservation preemption command, then sending the second reservation preemption command to the second storage device using the forwarding port, and performing, by the second storage device, a reservation preemption operation based on the port identifier of the target port included in the second reservation preemption command. Therefore, the host can preempt the LU of the second storage device using the first storage device. The target port may be any host port, the to-be-checked reservation key is used to check the host by the second storage device, and the port mapping relationship includes a mapping relationship between the target port and the forwarding port.

Therefore, it may be learned that the reservation preemption command is sent by the first storage device to the second storage device instead of being executed on the first storage device. This resolves a problem that reservation preemption commands of different hosts are executed on different storage devices. A new storage device and an original storage device execute control instructions of a same host in a data migration process, and therefore, data in the new storage device can be consistent with data in the original storage device. In addition, according to the command processing method provided in the present disclosure, each storage device may identify and process the second reservation preemption command. Therefore, the data processing method of the present disclosure may be applied, with no need to use an NPIV function for port simulation, to both a SAN and a direct attached network without a Fiber Channel switch, and can be applied in more scenarios.

In a possible implementation of the first aspect, before determining, based on a preset port mapping relationship, a forwarding port corresponding to the target port, the first storage device obtains the port identifier of the target port, selects at least one port from ports that establish a correspondence with a target LU of the second storage device as a forwarding port, and then establishes a port mapping relationship between the forwarding port and the target port based on the port identifier of the target port. The first storage device may further obtain a reservation key stored in the target LU, generate a reservation registration command based on the port identifier of the forwarding port and a reservation key corresponding to the target port, and then send the reservation registration command to the target LU using the forwarding port, where the second storage device records a correspondence between the reservation key corresponding to the target port and the forwarding port based on the reservation registration command.

Therefore, it may be learned that, in the present disclosure, the port mapping relationship between the target port and the forwarding port is set, and the forwarding port is registered on the target LU such that the first storage device may forward, using the forwarding port, information that is from the target port to the target LU. The reservation key of the forwarding port is consistent with the reservation key of the target port, and therefore, the host may transmit data after completing the reservation preemption.

Further, in another possible implementation of the first aspect, before the first storage device obtains a reservation key stored in the target LU, the first storage device reads identification information of the target LU in the second storage device, and creates a virtual LU based on the identification information, and maps the virtual LU to a host port.

Further, in another possible implementation of the first aspect, after sending the reservation registration command to the target LU using the forwarding port, the first storage device receives an I/O instruction sent by the host using the target port, where the I/O instruction is used to access the target LU using the virtual LU, and sends the I/O instruction to the target LU in the second storage device using the forwarding port.

With reference to the foregoing implementations of the first aspect, in another possible implementation of the first aspect, when all disk paths used to directly connect the host to the second storage device are forbidden, the first storage device receives a reservation forwarding disabling instruction, and disables a reservation forwarding function based on the reservation forwarding disabling instruction.

According to a second aspect, a storage device is provided, and the storage device may implement a function of a first storage device in the data processing method of the first aspect. The function may be implemented by hardware, or may be implemented by hardware by executing corresponding software.

According to a third aspect, a data processing system is provided, including a host, a second storage device, and a first storage device. The host may send a first reservation preemption command to the first storage device using a target port. After obtaining a port identifier of the target port included in the first reservation preemption command, a to-be-checked reservation key, and the LUN, the first storage device determines, based on a preset port mapping relationship, a forwarding port corresponding to the target port, encapsulates the to-be-checked reservation key, the LUN, the port identifier of the target port, and a port identifier of the forwarding port to obtain a second reservation preemption command, and then sends the second reservation preemption command to the second storage device using the forwarding port. After receiving the second reservation preemption command, the second storage device determines an LU corresponding to the LUN, and searches reservation registration information stored in the LU for a target reservation key corresponding to the target port, and if the to-be-checked reservation key is consistent with the target reservation key, the second storage device performs a reservation preemption operation based on the port identifier of the target port.

Therefore, it may be learned that the reservation preemption command is sent by the first storage device to the second storage device instead of being executed on the first storage device. This resolves a problem that reservation preemption commands of different hosts are executed on different storage devices. A new storage device and an original storage device execute control instructions of a same host in a data migration process, and therefore, data in the new storage device can be consistent with data in the original storage device. In addition, according to the command processing method provided in the present disclosure, each storage device may identify and process the second reservation preemption command. Therefore, the data processing method of the present disclosure may be applied, with no need to use an NPIV function for port simulation, to both a SAN and a direct attached networking scenario without a Fiber Channel switch, and can be applied in more scenarios.

It may be learned from the embodiments of the present disclosure that the first storage device receives the first reservation preemption command and the port identifier of the target port that are sent by the host using the target port, encapsulates the to-be-checked reservation key, the LUN, and the port identifier of the target port to obtain the second reservation preemption command, determines, based on the preset port mapping relationship, the forwarding port corresponding to the target port, and sends the second reservation preemption command to the second storage device using the forwarding port. The second storage device deletes other reservation keys based on the second reservation preemption command. Therefore, it may be learned that after receiving the original reservation preemption command, the first storage device does not perform the reservation preemption operation on the virtual LU based on the original reservation preemption command, but packetizes the original reservation preemption command and the port identifier of the target port to generate the new reservation preemption command, and forwards the new reservation preemption command to the second storage device. When receiving the new reservation preemption command, the second storage device may perform the reservation preemption operation based on the port identifier of the target port and the to-be-checked reservation key. In the present disclosure, a problem of data inconsistency between the to-be-migrated LU and data of the virtual LU that is caused when the host preempts the virtual LU in the first storage device may be avoided. In addition, the present disclosure may be applied, with no need to use an NPIV function for port simulation, to a direct attached network without a Fiber Channel switch, and has better applicability.

DESCRIPTION OF EMBODIMENTS

Figure 3:
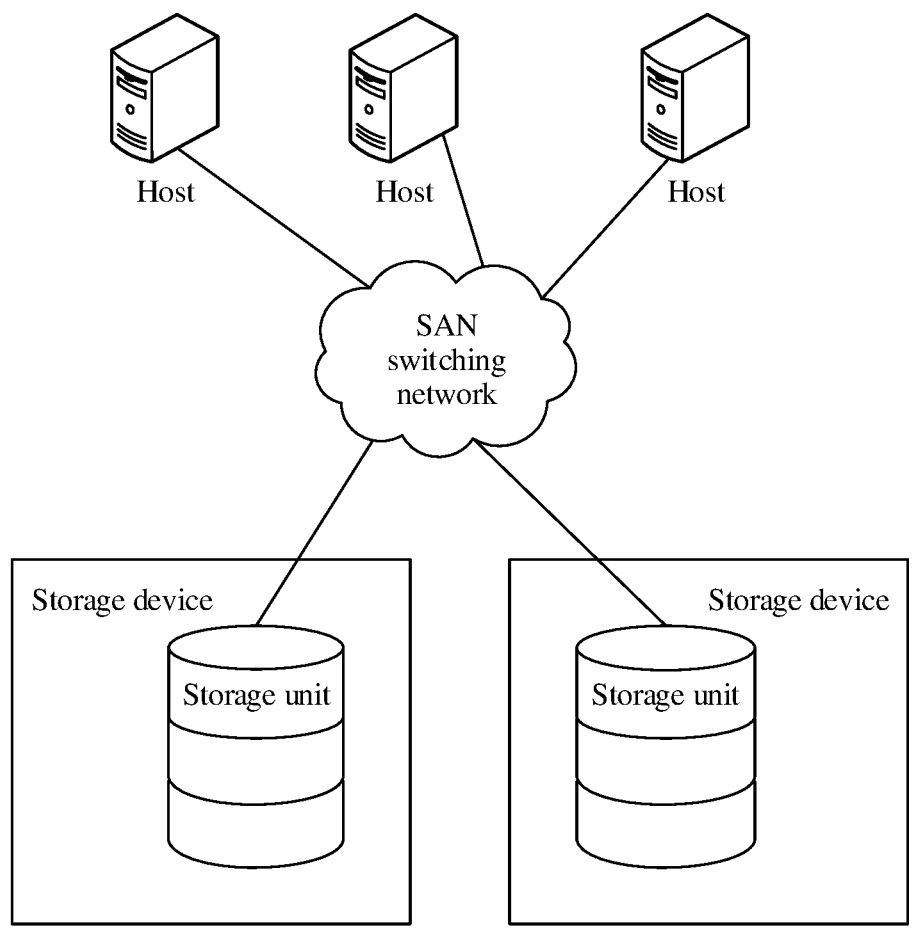
FIG. 3 is a schematic diagram of an application scenario of a data processing method according to an embodiment of the present disclosure.

The following first describes an application environment of a data processing method provided in the present disclosure. The data processing system of the present disclosure may be a SAN or a direct attached storage (DAS) system. The following uses the SAN as an example to describe, in detail, the data processing system of the present disclosure. Referring to FIG. 3, the SAN system includes a host cluster, a SAN switching network, and a storage array.

Figure 4:
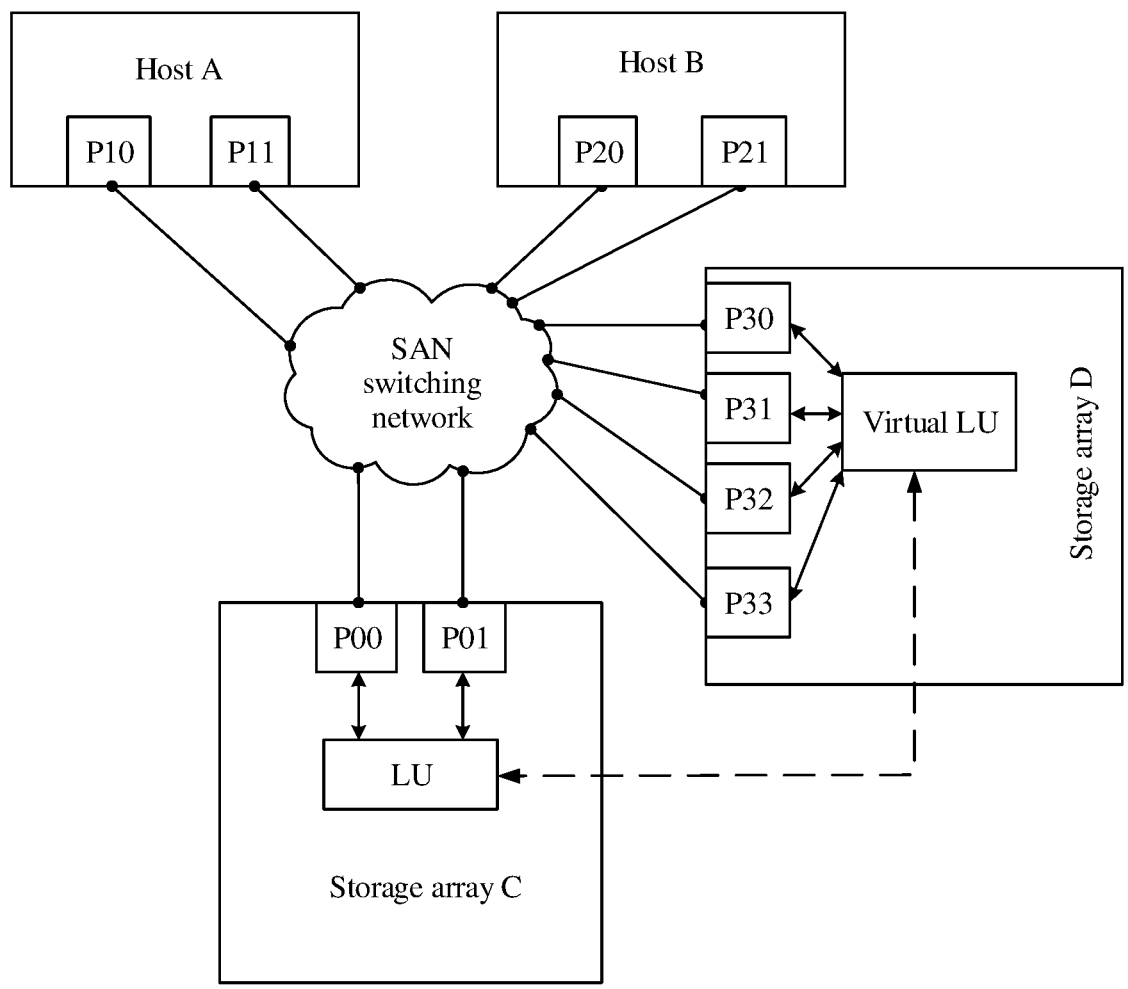
FIG. 4 is another schematic diagram of an application scenario of a data processing method according to an embodiment of the present disclosure.

The host cluster includes several hosts, and each host is also referred to as a cluster node. Each host is connected to a storage device using the SAN switching network. Each host may include one or more ports. For example, as shown in FIG. 4, a host A includes a P10 and a P11, a host B includes a P20 and a P21, and the like.

The SAN switching network is a dedicated fiber channel network that connects a storage device and a host, and includes a server supporting the fiber channel, a fiber channel card (network adapter), a fiber channel hub/switch, and a fiber channel storage apparatus. Three most important parts of the SAN switching network are a device interface (for example, a small computer system interface (SCSI) and a fiber channel), a connection device (for example, a switch, a gateway, a router and a hub), and a communication control protocol (for example, the Internet Protocol (IP) and a SCSI protocol).

The storage device is usually a storage array including a plurality of storage units. The storage unit may be described using an LU, and each LU may be identified by a LUN. The storage array may provide one or more LUs for the host to access. The storage device may include a plurality of ports. For example, a storage array C includes a P00 and a P01, a storage array D includes a P30, a P31, a P32, a P33, and the like, as shown in FIG. 4.

Figure 2:
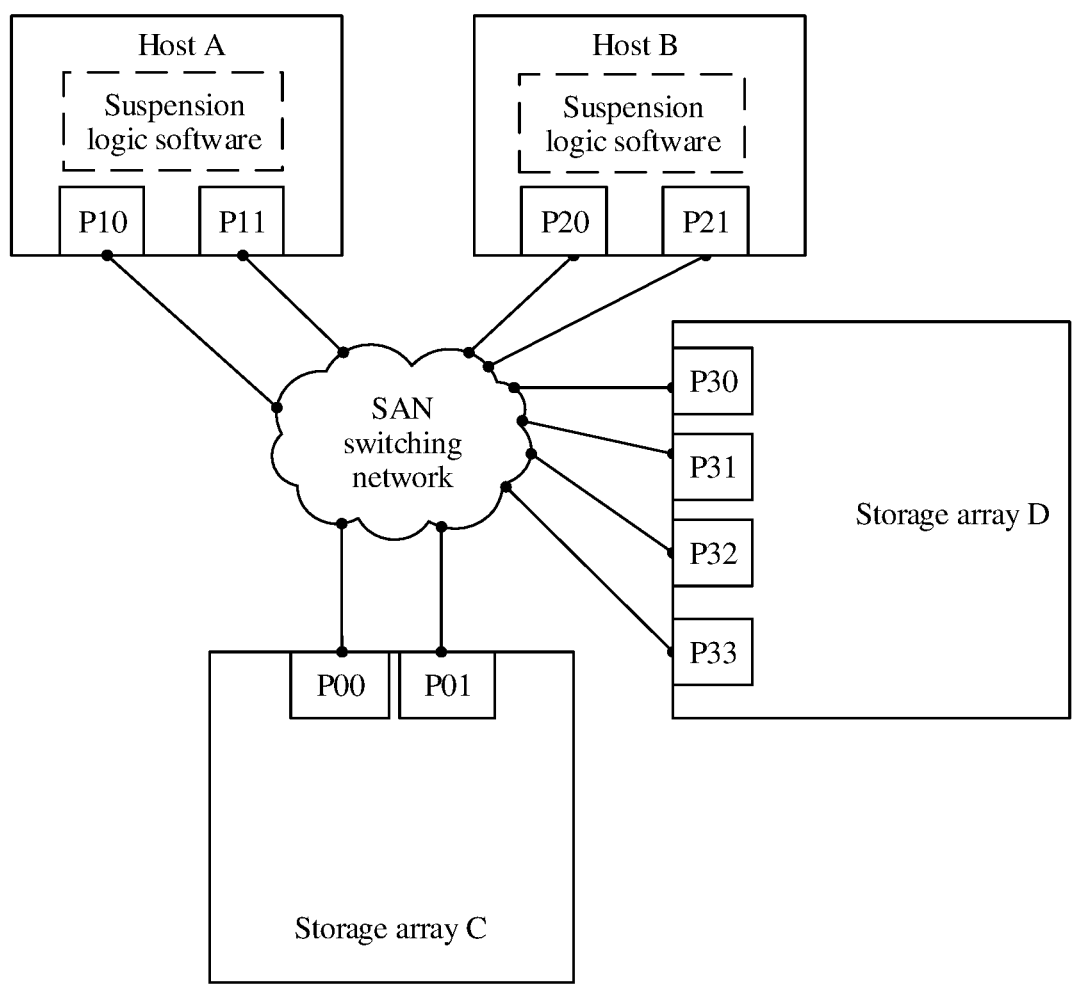
FIG. 2 is another schematic diagram of an application scenario of a data processing method.

In a data migration preparation phase, to avoid that the host A and the host B preempt the new storage array and the original storage array, which leads to data inconsistency, there are two data processing methods in the other approaches to resolve the problem (See FIG. 2).

Method 1: Each host setting is located at a suspension logic software processing layer at a lower layer of cluster software to intercept all commands delivered by the host. When the host delivers a reservation preemption command to a designated LU, the host may use the suspension logic software to detect the reservation preemption command such that the reservation preemption command is suspended without being sent to the original storage array or the new storage array. After the new storage array takes over the original storage array, the suspended command is delivered to the new storage array.

If the command is suspended for an extremely long period of time, the host may consider that the command fails to be executed, and reservation preemption cannot be implemented, or if the command is suspended for an extremely short period of time, and the reservation preemption command is delivered to the storage array before the takeover step is completed, the problem of data inconsistency cannot be resolved. Therefore, a disadvantage of using the suspension reservation preemption command is a great limitation of the suspension time, which leads to limited applicability.

Figure 1:
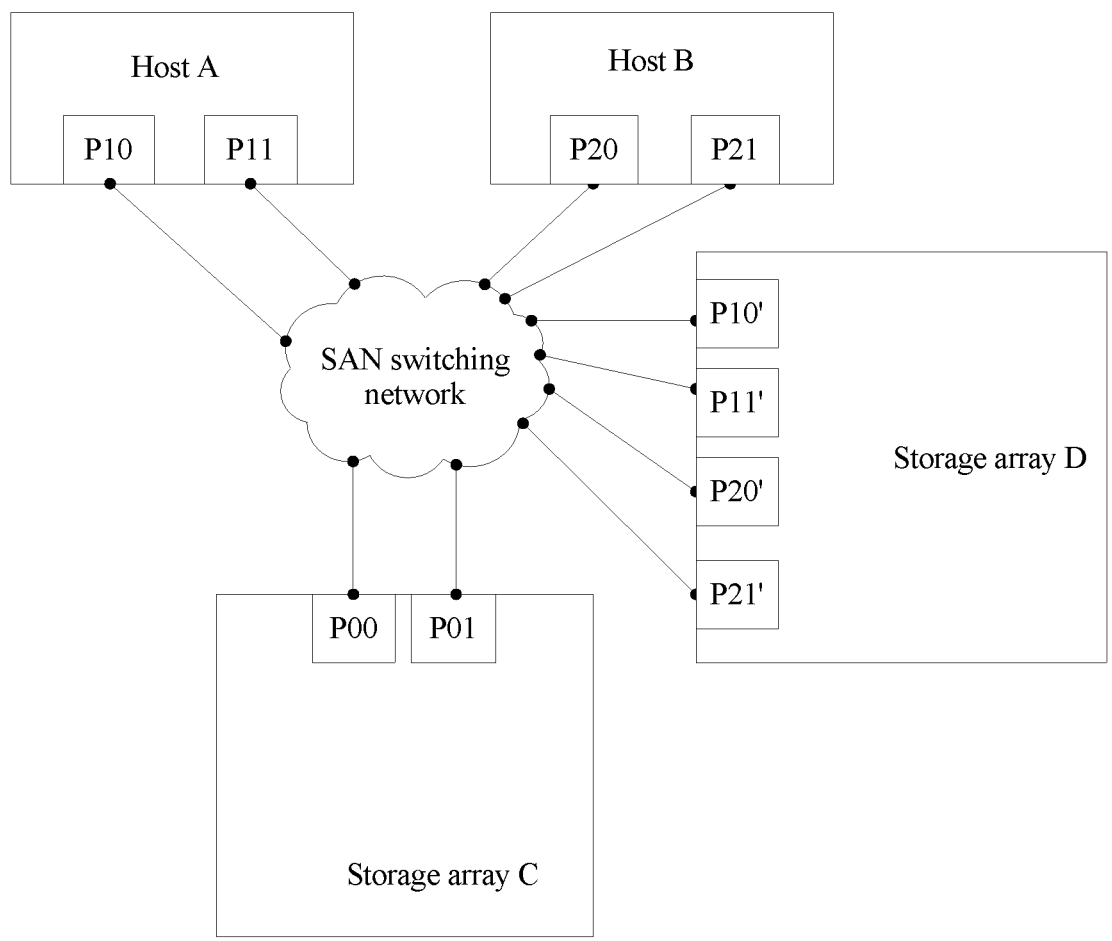
FIG. 1 is a schematic diagram of an application scenario of a data processing method.

Method 2: A first storage array uses an NPIV function and uses a port of the first storage array to perform one-to-one simulation on host ports of each host. As shown in FIG. 1, a WWN of a P10' of the first storage array is set to a WWN of a P10, and a WWN of a P11' is set to a WWN of a P11. When the first storage array receives a command from the P10 port, the first storage array selects the P10' corresponding to the P10, and forwards, using the P10', the reservation preemption command in an original state to the second storage array. The second storage array may determine, based on the WWN of the P10' (that is, the WWN of the P10), that a source of the reservation preemption command is the host A, and then performs an operation of preempting a to-be-migrated LU by the host A.

However, in the other approaches, an NPIV technology needs to be implemented based on a Fiber Channel switch. In a networking scenario without the FC switch, the foregoing reservation preemption method cannot be implemented and has a great limitation.

To resolve the foregoing problem, the present disclosure provides a data processing method, and a core idea of the method is setting a new reservation preemption command and a process of the new reservation preemption command by the storage device. The reservation preemption command includes port information of the host port. The first storage device can forward the new reservation preemption command to the second storage device. When receiving the reservation preemption command, the second storage device can perform reservation preemption based on the port information of the host port included in the reservation preemption command.

Before the data processing method of the present disclosure is implemented, a preparation phase of the data processing method of the present disclosure is described first to facilitate understanding.

In a data processing system, as shown in FIG. 4, the host A and the host B separately send a reservation registration command to an LU_1 of the storage array C. It is assumed that a reservation key of the host A is a KeyA, a port of the host A that delivers the reservation registration command is the P10, a reservation key of the host B is a KeyB, and a port of the host B that delivers the reservation registration command is the P20. The storage array C may record a correspondence between the host ports and the reservation keys, as shown in table below.

| LU | Host port | Reservation key |
|---|---|---|
| LU_1 | P10 | KeyA |
| LU_1 | P11 | KeyA |
| LU_1 | P20 | KeyB |
| LU_1 | P21 | KeyB |

After registration, the host A and the host B have permission to access the LU_1. When performing a persistent reservation operation, both the host may have permission to operate the LU_1 if the persistent reservation is performed successfully. The host may further deliver an I/O instruction to the LU_1 using the foregoing host port, and the storage array C allows the I/O instruction from the foregoing host port to perform a read/write operation on the LU_1.

Figure 5:
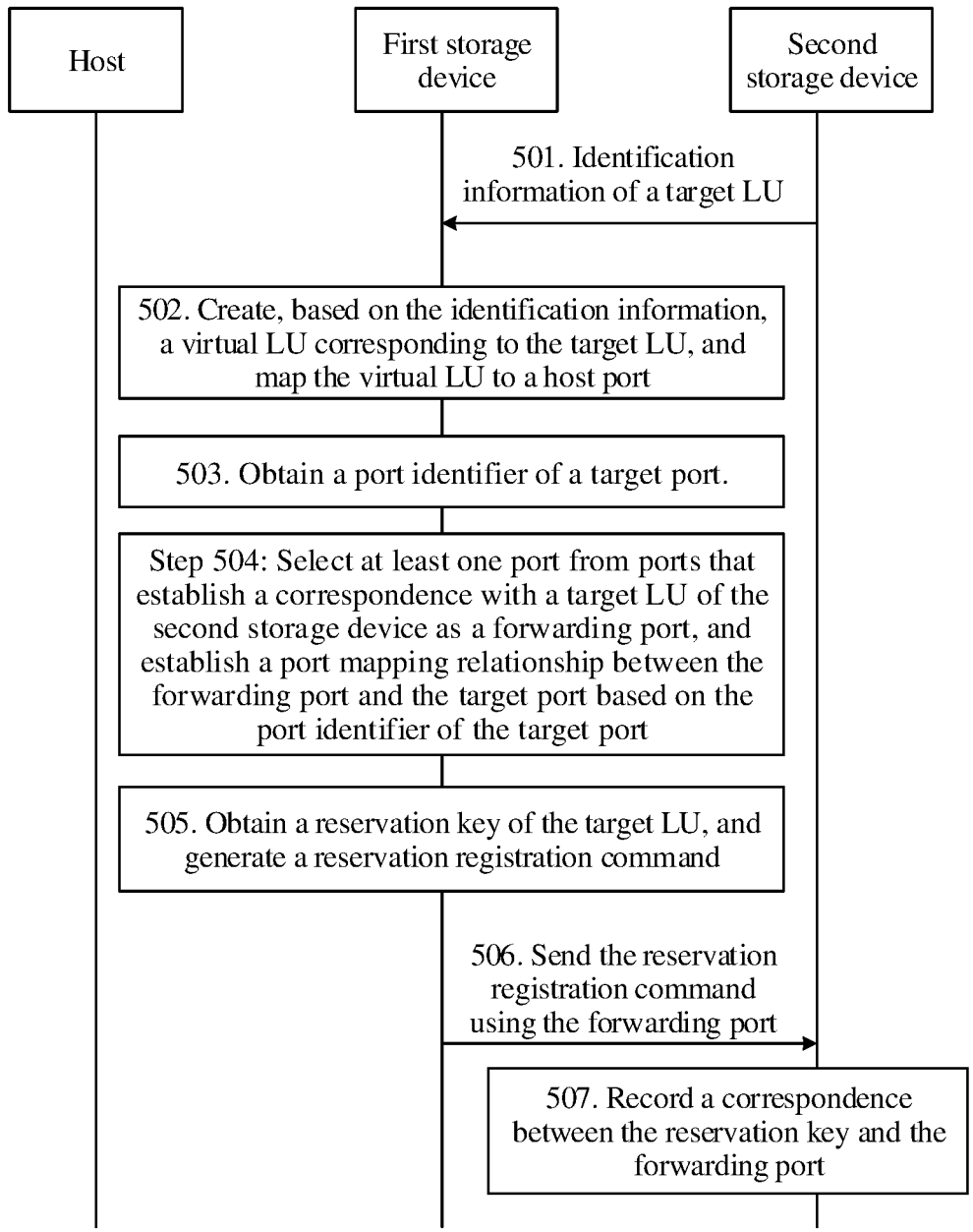
FIG. 5 is a schematic diagram of a data processing method according to an embodiment of the present disclosure.

If data migration is performed between the first storage device and the second storage device, the second storage device may first map the LU to the first storage device. For a detailed process, refer to the following embodiment. Referring to FIG. 5, an embodiment of a data processing method of the present disclosure includes the following steps.

Step 501: The first storage device reads identification information of a target LU in the second storage device.

Step 502: The first storage device creates a virtual LU based on the identification information, and maps the virtual LU to a host port.

In this embodiment, the target LU may be any LU in the second storage device. Virtual LUs are in a one-to-one correspondence with target LUs. After the first storage device is connected to a switching network, the first storage device may establish a communication connection to the second storage device using the switching network, and establishes an access path from a port of the first storage device to the target LU. After reading the identification information of the target LU in the second storage device, the first storage device creates the virtual LU based on the identification information, and then maps the virtual LU to the host port.

After the first storage device maps the virtual LU to the host port, if a host accesses the virtual LU in a disk scanning process, the first storage device may read data from the target LU of the second storage device, and feed back the data to the host. In this case, the host may consider a path from the host to the virtual LU as a new path from the host to the target LU. For the host, after a new path appears, a disk path management program of the host may switch a subsequent I/O stream to the new path. The new path coexists with an original path when the original path is not completely forbidden.

Step 503: The first storage device obtains a port identifier of a target port.

Step 504: The first storage device selects at least one port from ports that establish a correspondence with a target LU of the second storage device as a forwarding port, and establishes a port mapping relationship between the forwarding port and the target port based on the port identifier of the target port.

It may be learned from step 501 and step 502 that the first storage device may access the target LU using several ports. The first storage device may select all or some of the several ports as forwarding ports, and establishes a mapping relationship between the forwarding ports and host ports.

It should be noted that the first storage device may divide the foregoing forwarding ports into a plurality of port groups based on the number of hosts. The hosts are in a one-to-one correspondence with the port groups. Each host may deliver an I/O stream from any host port. The first storage device may select one forwarding port from a corresponding port group, and forward the foregoing I/O stream to the second storage device.

Step 505: The first storage device obtains a reservation key stored in the target LU, and generates a reservation registration command based on the port identifier of the forwarding port and a reservation key corresponding to the target port.

The target LU stores a correspondence between the target port and the reservation key. After obtaining the reservation key stored in the target LU, the first storage device may determine, based on the correspondence between the target port and the reservation key and the mapping relationship between the forwarding port and the target port, the reservation key corresponding to the forwarding port, and then generates the reservation registration command of the forwarding port. The reservation registration command includes the port identifier of the forwarding port and a reservation key corresponding to the forwarding port.

Step 506: The first storage device sends the reservation registration command to the target LU using the forwarding port.

Step 507: The second storage device records, based on the reservation registration command, a correspondence between the reservation key corresponding to the target port and the forwarding port.

After obtaining the foregoing reservation registration command, the second storage device may obtain information such as the port identifier of the forwarding port and the reservation key that are included in the reservation registration command, and then registers the forwarding port using the foregoing information. After the registration is complete, the forwarding port has permission to access the target LU. In this embodiment, the first storage device establishes the port mapping relationship between the target port and the forwarding port, and registers the forwarding port on the target LU such that the first storage device may forward, using the forwarding port, the information that is from the target port to the target LU.

For example, in the target LU, a correspondence between a host port, a forwarding port, an LU, and a reservation key may be shown in the table below.

| Host port | Forwarding port | LU | Reservation key |
|---|---|---|---|
| P10 | P30 | LU_1 | KeyA |
| P11 | P31 | LU_1 | KeyA |
| P20 | P32 | LU_1 | KeyB |
| P21 | P33 | LU_1 | KeyB |

It may be understood that if a plurality of forwarding ports correspond to a same host, the foregoing forwarding ports correspond to a same reservation key.

Figure 6:
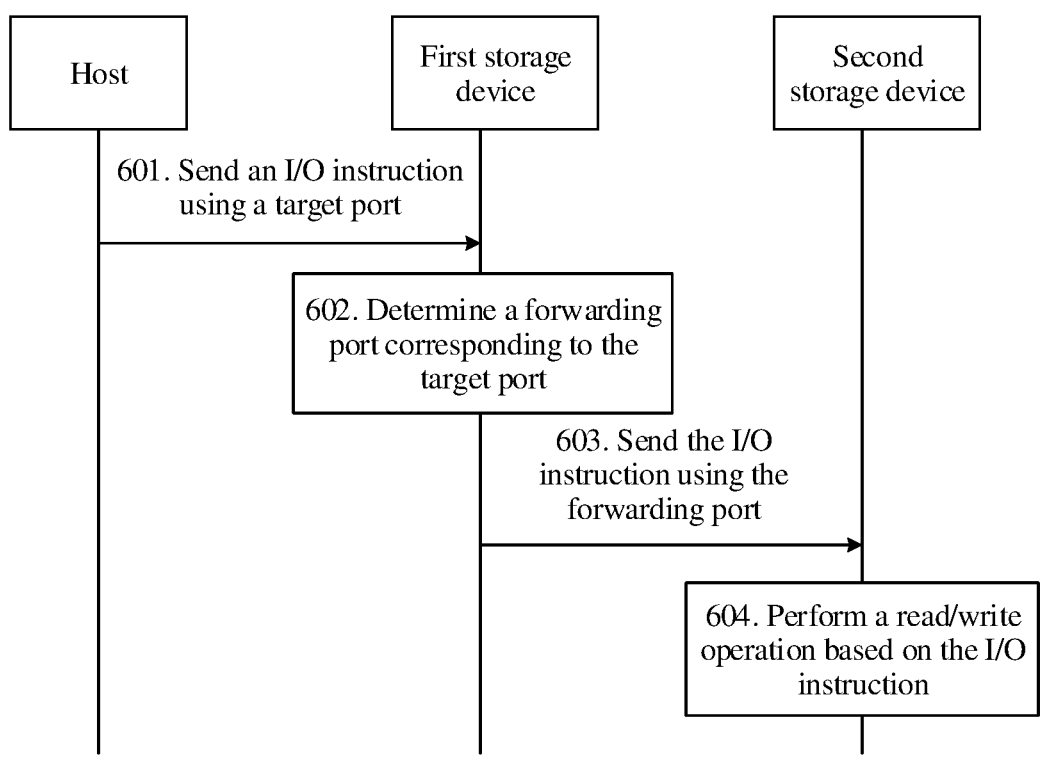
FIG. 6 is another schematic diagram of a data processing method according to an embodiment of the present disclosure.

Based on the embodiment shown in FIG. 5, referring to FIG. 6, another embodiment of the data processing method of the present disclosure includes the following steps.

Step 601: A host sends an I/O instruction using a target port, where the I/O instruction is used to access a target LU using a virtual LU.

Step 602: A first storage device determines, based on a port mapping relationship, a forwarding port corresponding to the target port. Further, after receiving the I/O instruction sent by the host, the first storage device may determine, based on the port mapping relationship established in FIG. 5, the forwarding port corresponding to the target port.

Step 603: The first storage device sends the I/O instruction to a target LU in a second storage device using the forwarding port.

Step 604: The second storage device performs a read/write operation in the target LU based on the I/O instruction.

In this embodiment, after the first storage device establishes the port mapping relationship between the target port and the forwarding port, and registers the forwarding port on the target LU, the forwarding port has the permission to access the target LU. Therefore, the first storage device may send, to the target LU of the second storage device using the forwarding port, the I/O instruction that is delivered from the target port. It may be understood that the first storage device may further forward, to the target LU, other information that is delivered from the target port.

It should be noted that when the forwarding port of the first storage device fails to be registered on the target LU, the forwarding port does not have the permission to access the target LU, and the second storage device will not respond to the I/O instruction from the forwarding port.

Figure 7:
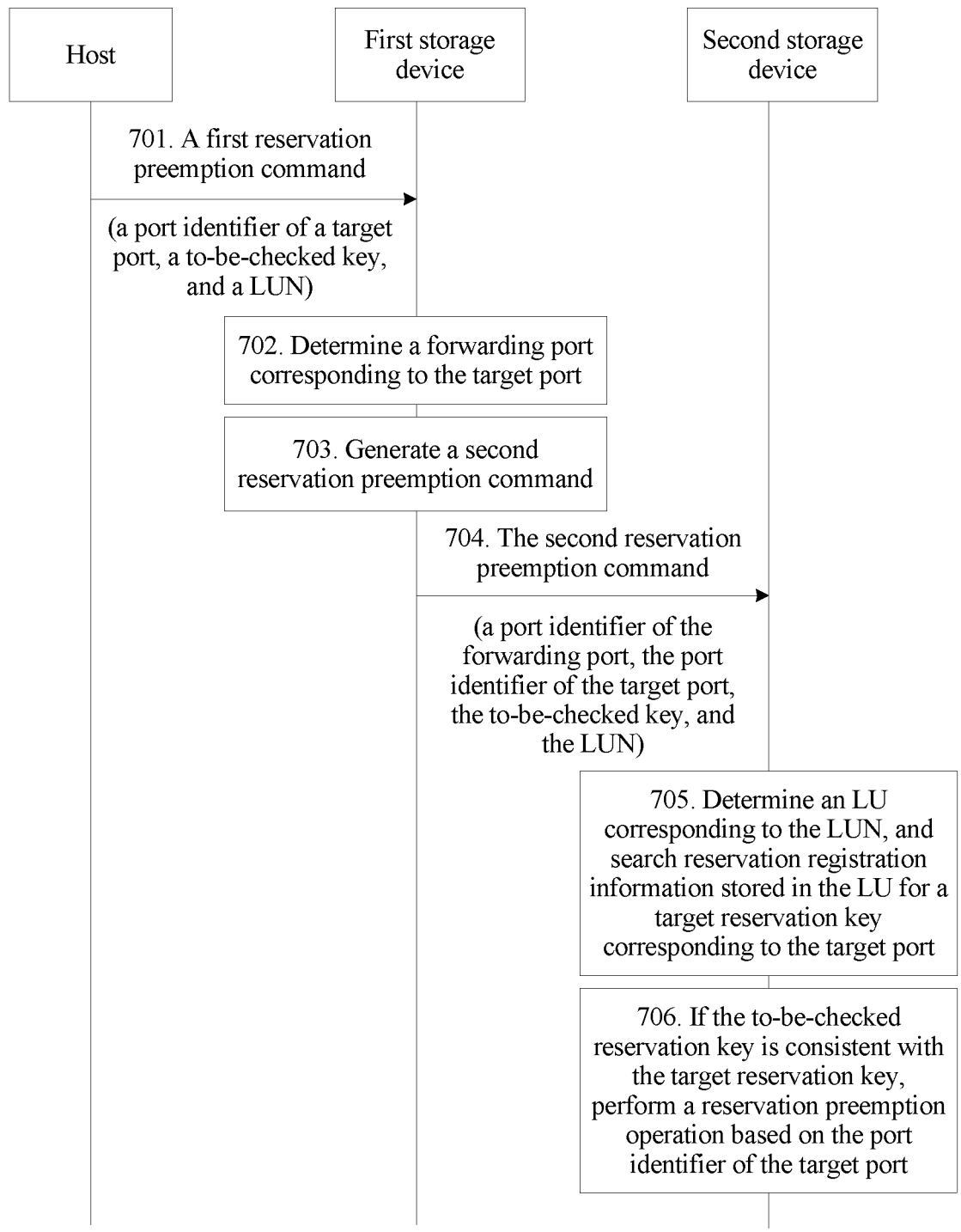
FIG. 7 is another schematic diagram of an application scenario of a data processing method according to an embodiment of the present disclosure.
Figure 8:
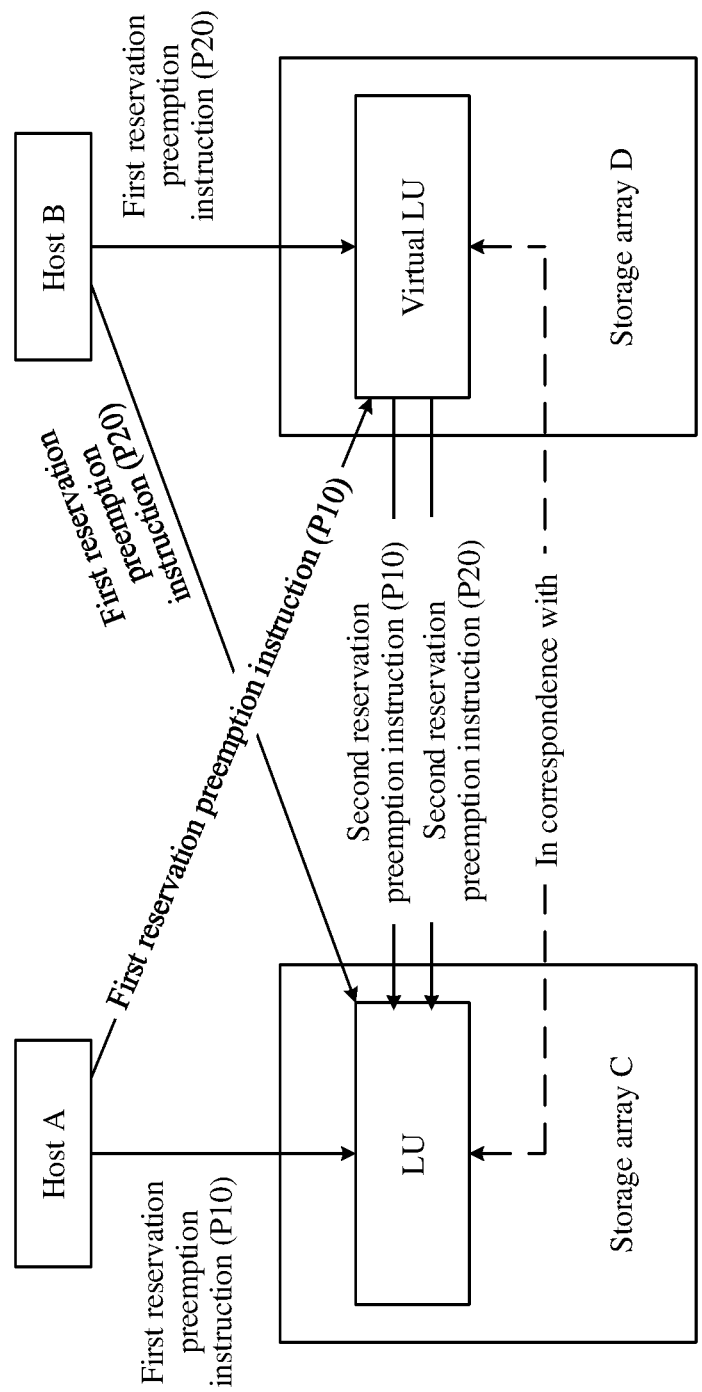
FIG. 8 is another schematic diagram of a data processing method according to an embodiment of the present disclosure.

Based on the embodiment shown in FIG. 6, the following describes, in detail, the data processing method provided in the present disclosure. Referring to FIG. 7, an embodiment of the data processing method provided in the present disclosure includes the following steps.

Step 701: A host sends a first reservation preemption command to a first storage device using a target port.

In this embodiment, the first reservation preemption command is also referred to as a persistent reservation (also referred to as PR) command. The first reservation preemption command includes a port identifier of the target port, a to-be-checked reservation key, and a LUN. The LUN corresponds to an access object of the host (that is, a target LU), and the to-be-checked reservation key is used to check the target port by a second storage device. The target port is a host port used to send the first reservation preemption command, and the port identifier of the target port is usually a WWN of the target port.

For example, a format of the first reservation preemption command may be: <port identifier of a target port>+<to-be-checked reservation key>+<LUN>. Certainly, the first reservation preemption command may further include other information. The other information is not an inventive point of the present disclosure, and therefore, details are not described herein.

Step 702: The first storage device determines, based on a preset port mapping relationship, a forwarding port corresponding to the target port. For the port mapping relationship, refer to the port mapping relationship in the embodiment shown in FIG. 5.

Step 703: The first storage device encapsulates a to-be-checked reservation key, a LUN, a port identifier of the target port, and a port identifier of the forwarding port to obtain a second reservation preemption command.

Further, after receiving the first reservation preemption command, the first storage device may encapsulate information included in the first reservation preemption command (for example, the port identifier of the target port, the to-be-checked reservation key, and the LUN) and the port identifier of the forwarding port to generate the second reservation preemption command.

It may be understood that a format of the second reservation preemption command may be: <port identifier of a forwarding port>+<first reservation preemption command> or <port identifier of a forwarding port>+<port identifier of a target port>+<to-be-checked reservation key>+<LUN>. A location relationship of parameters included in the reservation preemption command is not limited. In the present disclosure, the format of the reservation preemption command may be set to one of the foregoing command formats, and a corresponding command processing rule is set. Each storage device may process the second reservation preemption command using the setting command processing rule, for example, identification, encapsulation, or decapsulation.

Step 704: The first storage device sends the second reservation preemption command to a second storage device using the forwarding port.

For example, a correspondence between the target LU, the host port, and the forwarding port may be shown in the table below.

| LU | Host port | Forwarding port |
|---|---|---|
| LU_1 | P10 | P30 |
| LU_1 | P20 | P32 |

The first storage device may send, using a P30, an I/O stream that is from the P10 to a target LU of the second storage device. The P30 may receive the I/O stream, and may also send the I/O stream.

It should be noted that the first storage device may further set a port pair. The port pair includes a receiving port and a sending port. The receiving port is configured to receive an I/O stream from the host port, and the sending port is configured to send the I/O stream that is received by the receiving port to the second storage device.

Step 705: The second storage device determines an LU corresponding to the LUN, and searches reservation registration information of the LU for a target reservation key corresponding to the target port.

Further, after receiving the second reservation preemption command, the second storage device may decapsulate the second reservation preemption command, obtain a port identifier of the target port, a to-be-checked key, and a LUN that are included in the second reservation preemption command, determine the LU corresponding to the LUN, and search the reservation registration information of the LU for the target reservation key corresponding to the target port. It may be understood that hosts are in a one-to-one correspondence with reservation keys in the reservation registration information.

For example, a correspondence between the LU, the host port, and the target reservation key may be shown in the table below.

| LU   | Host port | Reservation key |
|------|-----------|-----------------|
| LU_1 | P10       | KeyA            |
| LU_1 | P11       | KeyA            |
| LU_1 | P20       | KeyB            |
| LU_1 | P21       | KeyB            |

It may be understood that if the port information of the target port is not found in the reservation registration information, it indicates that the target port has not been registered, and does not have permission to access the target LU.

Step 706: If the to-be-checked reservation key is consistent with the target reservation key, the second storage device performs a reservation preemption operation based on the port identifier of the target port.

The second storage device compares the to-be-checked reservation key with the target reservation key. If the to-be-checked reservation key is inconsistent with the target reservation key, it indicates that the target port is an unregistered port, and does not have permission to access the target LU.

If the to-be-checked reservation key is consistent with the target reservation key, it indicates that the target port is a registered port, and has permission to access the target LU. The second storage device performs the reservation preemption operation based on the port identifier of the target port. Further, the second storage device may delete other reservation keys other than the target reservation key in the reservation registration information. Target reservation keys are in a one-to-one correspondence with hosts, and therefore, other hosts do not have permission to access the target LU after other reservation keys are deleted.

For example, a reservation key corresponding to the host A is a KeyA, and when the host A delivers a reservation preemption command using any host port, and successfully preempts a target LU, the second storage device deletes other reservation keys (for example, a KeyB and a KeyC) other than the KeyA. When the host B sends a reservation preemption command, because the reservation key of the host B has been deleted, access from the host B is not allowed by the target LU.

In the other approaches, if an NPIV technology is not used, when a second storage array identifies a source of the reservation preemption command based on a delivery port, and the first storage device forwards the reservation preemption command to the second storage device, the second storage array considers that a first storage array preempts a to-be-migrated LU. Consequently, the host cannot preempt the target LU using the first storage array.

In this embodiment, the second storage device may correctly identify the source of the reservation preemption command based on the reservation preemption command forwarded by the first storage device, thereby resolving the problem that the host cannot preempt the target LU using the first storage array.

In addition, the reservation preemption command is sent by the first storage device to the second storage device instead of being executed on the first storage device. This resolves a problem that reservation preemption commands of different hosts are executed on different storage devices. A new storage device and an original storage device execute control instructions of a same host in a data migration process, and therefore, data in the new storage device can be consistent with data in the original storage device.

Further, in the present disclosure, a processing rule on a new reservation preemption command may be set in the storage device, and each storage device may identify and process the new reservation preemption command. Therefore, the data processing method of the present disclosure may be applied, with no need to use an NPIV function for port simulation, to a SAN and a direct attached network without a Fiber Channel switch, and can be applied in more scenarios.

Based on the embodiment shown in FIG. 7, in another optional embodiment of the present disclosure, after step 706, the data processing method of the present disclosure further includes, when all disk paths used to directly connect the host to the second storage device are forbidden, receiving, by the first storage device, a reservation forwarding disabling instruction, and disabling a reservation forwarding function based on the reservation forwarding disabling instruction.

In this embodiment, when all the disk paths used to directly connect the host to the second storage device are forbidden, the host sends an instruction of a reservation type or an I/O instruction to the second storage device only using the first storage device. The instruction of the reservation type includes a reservation preemption instruction (also referred to as a PR instruction), a reservation registration command (also referred to as a register instruction), a reservation query instruction, a persistent reservation instruction (also referred to as a reserve instruction), and the like.

When the first storage device disables the reservation forwarding function, if a split brain occurs again between the host A and the host B, the reservation preemption command delivered by the host A or the host B is executed on the first storage device in order to ensure consistency of execution results of the foregoing command.

To facilitate understanding, the following uses a specific application scenario to describe in detail the data processing method provided in this embodiment of the present disclosure.

In the specific application scenario of the present disclosure, the first storage device is an array D, and the second storage device is an array C. The target LU is described based on a Disk_1. In the following example, when the array D is connected to the SAN, the array C may map the Disk_1 to a port of the array D, ports of the array D are a P30 and a P31, and an access path from the P30 to the Disk_1 and an access path from the P31 to the Disk_1 are separately established.

The array D separately establishes a correspondence between the P10 of the host A and the P30 and a correspondence between the P11 of the host A and the P31. The array D reads, from the Disk_1, a reservation key corresponding to the P10, for example, the reservation key is the KeyA, determines that a reservation key corresponding to the P30 is the KeyA, and then sends reservation registration information (including the P30 and the KeyA) to the array C using the P30. A registration process of the P31 is similar to a registration process of the P30.

After obtaining identification information of the Disk_1 in the array C, the array D creates a virtual LU inside the array D. Virtual LUs are in a one-to-one correspondence with Disk_1s in the array C. Then, a mapping relationship is also established between these virtual LUs and host ports (P10/P11). When the host executes a disk scanning program, and the host accesses a data file stored in the Disk_1, the host may initiate an I/O instruction to the array D, and then the array D feeds back, to the host, data that is read from the array C. In this way, the host may directly access the array C, and may access the virtual LU of the array D. The host may use a path from the host to the virtual LU as a new path from the host to the Disk_1.

When the host A and the host B access the Disk_1, and when communication interruption occurs between the host A and the host B, the host A and the host B separately deliver a reservation preemption instruction to the Disk_1.

It is assumed that the reservation preemption command of the host A first arrives at the Disk_1. After the host A sends a WWN, a LUN, and a KeyA' of the P10 to the P30 of the array D using the P10, the array D encapsulates the WWN, the LUN, and the KeyA' of the P10 and a WWN of the P30 to obtain a new reservation preemption command, and sends the new reservation preemption command to the array C using the P30. The array C decapsulates the new reservation preemption command, detects that the new reservation preemption command includes the WWN of the P10, and therefore, determines that the reservation preemption command is from the P10. The array C finds that a reservation key corresponding to the WWN of the P10 is a KeyA, and compares the KeyA' with the KeyA. If the KeyA' is the same as the KeyA, an interface related to the P10 is invoked to perform a persistent reservation preemption procedure. For example, the array C deletes other reservation keys, for example, a KeyB and a KeyC. In this way, all ports (for example, a P20, a P21, and a P33) registered by the host B using the KeyB lose permission to access the Disk_1.

The host B sends a WWN, a LUN, and a KeyB' of the P20 to the array C using the P20. Because the KeyB has been deleted, the host B no longer has permission to access the Disk_1, and fails to perform reservation preemption.

It should be noted that, in the present disclosure, the reservation preemption is performed in sequence. If the host B delivers the reservation preemption command before the host A, and successfully executes the reservation preemption command, the storage array C may delete the KeyA and reserve only the KeyB. Consequently, the host A cannot perform the persistent reservation preemption procedure.

The foregoing has described the data processing method in the embodiments of the present disclosure from a perspective of a method. The following describes the data processing method in the embodiments of the present disclosure from a perspective of an apparatus.

Figure 9:
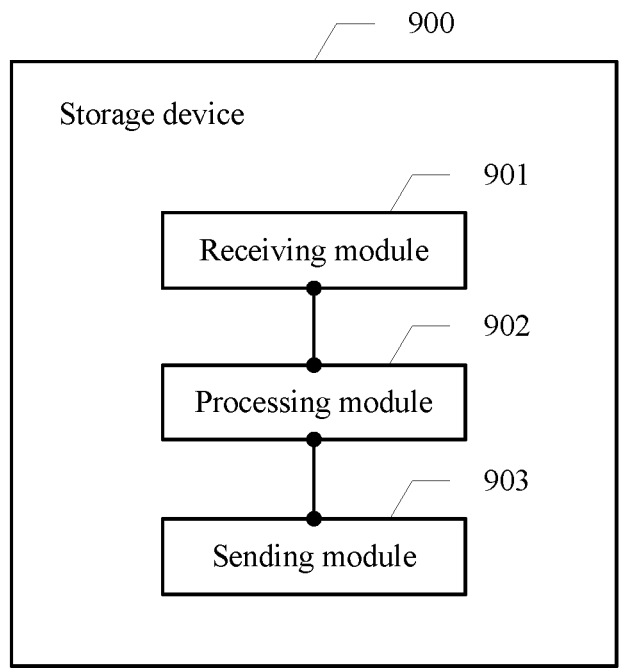
FIG. 9 is a schematic diagram of a storage device according to an embodiment of the present disclosure.

Referring to FIG. 9, the present disclosure provides a storage device to implement a function of a first storage device in the embodiments shown in FIG. 5 to FIG. 6. An embodiment of the storage device 900 provided in the present disclosure includes a receiving module 901 configured to receive a first reservation preemption command sent by a host using a target port and a port identifier of the target port, where the first reservation preemption command includes a to-be-checked reservation key and a LUN, and the to-be-checked reservation key is used to check the host by a second storage device, a processing module 902 configured to determine, based on a preset port mapping relationship, a forwarding port corresponding to the target port, where the port mapping relationship includes a mapping relationship between the target port and the forwarding port, where the processing module 902 is further configured to encapsulate the to-be-checked reservation key, the LUN, the port identifier of the target port, and a port identifier of the forwarding port to obtain a second reservation preemption command, and a sending module 903 configured to send the second reservation preemption command to the second storage device using the forwarding port, where the second reservation preemption command is used to instruct the second storage device to perform a reservation preemption operation based on the port identifier of the target port.

Based on the embodiment shown in FIG. 9, in an optional embodiment of the present disclosure, before the first storage device determines, based on the preset port mapping relationship, the forwarding port corresponding to the target port the processing module 902 is further configured to obtain the port identifier of the target port, select at least one port from ports that establish a correspondence with a target LU of the second storage device as a forwarding port, and establish a port mapping relationship between the forwarding port and the target port based on the port identifier of the target port, and obtain a reservation key stored in the target LU, generate a reservation registration command based on the port identifier of the forwarding port and a reservation key corresponding to the target port, and send the reservation registration command to the target LU using the forwarding port, where the reservation registration command is used to instruct the second storage device to record a correspondence between the reservation key corresponding to the target port and the forwarding port.

Based on the embodiment shown in FIG. 9, in an optional embodiment of the present disclosure, the processing module 902 is further configured to read identification information of the target LU in the second storage device, create a virtual LU based on the identification information, and map the virtual LU to a host port.

Based on the embodiment shown in FIG. 9, in an optional embodiment of the present disclosure, the processing module 902 is further configured to receive an I/O instruction sent by the host using the target port, where the I/O instruction is used to access the target LU using the virtual LU, and send the I/O instruction to the target LU in the second storage device using the forwarding port.

Based on the embodiment shown in FIG. 9, in an optional embodiment of the present disclosure, the processing module 902 is further configured to receive a reservation forwarding disabling instruction, and disable a reservation forwarding function based on the reservation forwarding disabling instruction when all disk paths used to directly connect the host to the second storage device are forbidden.

Figure 10:
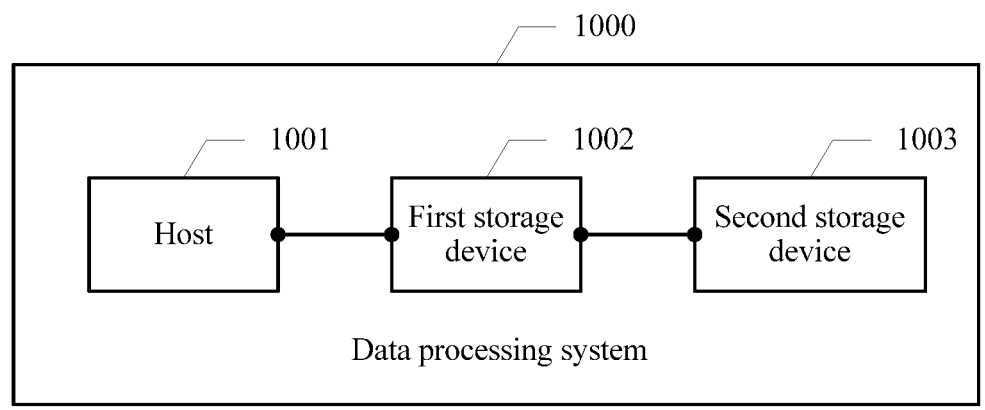
FIG. 10 is a schematic diagram of a data processing system according to an embodiment of the present disclosure.
Figure 11:
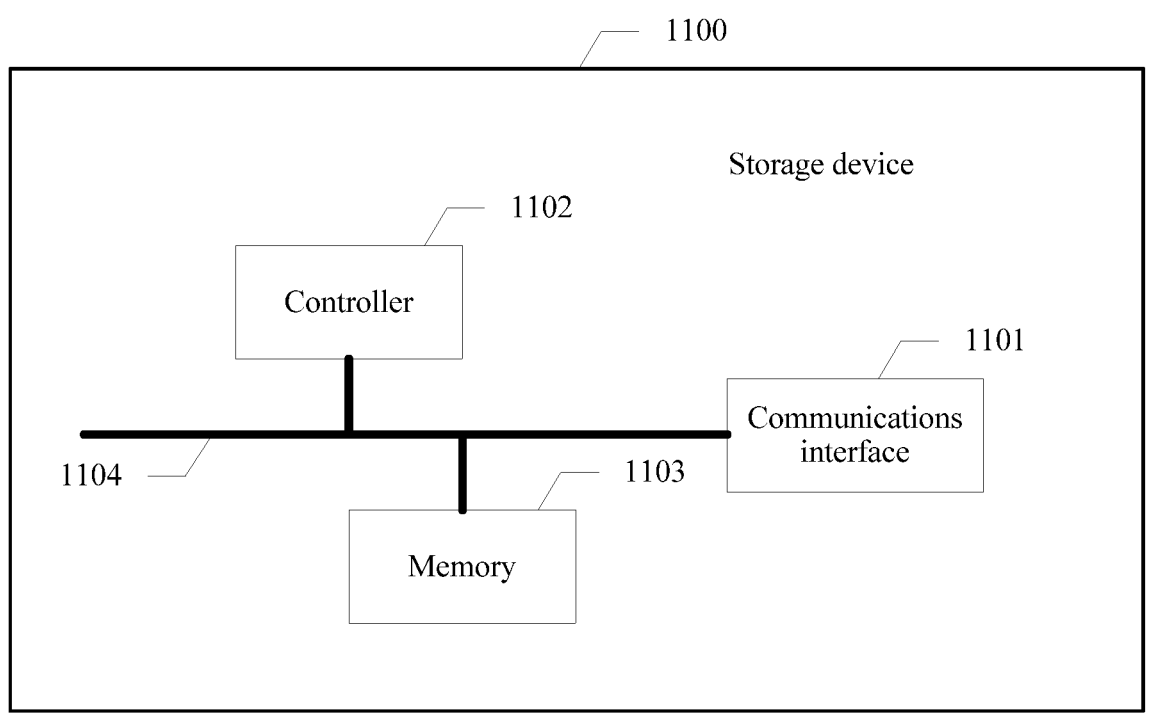
FIG. 11 is another schematic diagram of a storage device according to an embodiment of the present disclosure.

Referring to FIG. 10, an embodiment of a data processing system 1000 provided in the present disclosure includes a host 1001, a first storage device 1002, and a second storage device 1003.

The host 1001 is configured to send a first reservation preemption command to the first storage device using a target port, where the first reservation preemption command includes a port identifier of the target port, a to-be-checked reservation key, and a LUN, and the to-be-checked reservation key is used to check the host by the second storage device.

The first storage device 1002 is similar to the first storage device in the embodiment shown in FIG. 9 or the optional embodiment. A process in which the first storage device 1002 performs the data processing method of the present disclosure is similar to the embodiments shown in FIG. 5 to FIG. 7, and details are not described herein again.

The second storage device 1003 is configured to receive a second reservation preemption command sent by the first storage device, determine an LU corresponding to the LUN, and search reservation registration information stored in the LU for a target reservation key corresponding to the target port, and perform a reservation preemption operation based on the port identifier of the target port if the to-be-checked reservation key is consistent with the target reservation key.

To facilitate understanding, the following uses a specific application scenario to describe in detail interaction between all apparatuses in the data processing system provided in this embodiment of the present disclosure.

The target LU is described based on a Disk_1. In the following example, when the first storage device 1002 is connected to a SAN, the second storage device 1003 maps the Disk_1 to a port of the first storage device 1002, ports of the first storage device 1002 are a P30 and a P31, and an access path from the P30 to the Disk_1 and an access path from the P31 to the Disk_1 are separately established.

The first storage device 1002 separately establishes a correspondence between the P10 of the host A and the P30 and a correspondence between the P11 of the host A and the P31. The first storage device 1002 reads, from the Disk_1, a reservation key corresponding to the P10, for example, the reservation key is a KeyA, determines that a reservation key corresponding to the P30 is the KeyA, and then sends reservation registration information (including the P30 and the KeyA) to an array C using the P30. A registration process of the P31 is similar to a registration process of the P30.

After obtaining identification information of the Disk_1 in the second storage device 1003, the first storage device 1002 creates a virtual LU inside the first storage device 1002. Virtual LUs are in a one-to-one correspondence with Disk_1s in the second storage device 1003. Then, a mapping relationship is also established between these virtual LUs and host ports (P10/P11). When the host executes a disk scanning program, and the host accesses a data file stored in the Disk_1, the host may initiate an I/O instruction to the first storage device 1002, and then the first storage device 1002 feeds back the I/O instruction to the host based on data that is read from the second storage device 1003. In this way, the host may directly access the second storage device 1003, and may access the virtual LU of the first storage device 1002. The host may use a path from the host to the virtual LU as a new path from the host to the Disk_1.

When the host A and the host B access the Disk_1, and when communication interruption occurs between the host A and the host B, the host A and the host B separately deliver a reservation preemption instruction to the Disk_1.

It is assumed that the reservation preemption command of the host A first arrives at the Disk_1. After the host A sends a WWN, a LUN, and a KeyA' of the P10 to the P30 of the first storage device 1002 using the P10, the first storage device 1002 encapsulates the WWN, the LUN, and the KeyA' of the P10 and a WWN of the P30 to obtain a new reservation preemption command, and sends the new reservation preemption command to the second storage device 1003 using the P30. The second storage device 1003 decapsulates the new reservation preemption command, detects that the new reservation preemption command includes the WWN of the P10, and therefore, determines that the reservation preemption command is from the P10. The second storage device 1003 finds that a reservation key corresponding to the WWN of the P10 is a KeyA, and compares the KeyA' with the KeyA. If the KeyA' is the same as the KeyA, an interface related to the P10 is invoked to perform a persistent reservation preemption procedure. For example, the second storage device 1003 deletes other reservation keys, for example, a KeyB and a KeyC. In this way, all ports (for example, a P20, a P21, and a P33) registered by the host B using the KeyB lose permission to access the Disk_1.

The host B sends a WWN, a LUN, and a KeyB' of the P20 to the second storage device 1003 using the P20. Because the KeyB has been deleted, the host B no longer has permission to access the Disk_1, and fails to perform reservation preemption.

It should be noted that, in the present disclosure, the reservation preemption is performed in sequence. If the host B delivers the reservation preemption command before the host A, and successfully executes the reservation preemption command, the second storage device 1003 may delete the KeyA and reserve only the KeyB. Consequently, the host A cannot perform the persistent reservation preemption procedure.

The following describes a storage device 1100 in this embodiment of the present disclosure from a perspective of a hardware apparatus. The first storage device and the second storage device in the embodiments shown in FIG. 5 to FIG. 8 may implement, based on a structure of the storage device, the data processing method provided in the present disclosure.

The storage device 1100 may be a device such as a disk or a disk array, and is configured to store data and an operation instruction. The storage device 1100 includes a communications interface 1101, a controller 1102, a memory 1103, and a bus 1104. The communications interface 1101, the controller 1102, and the memory 1103 are connected using the bus 1104. The memory 1103 is configured to store data and an operation instruction. The controller 1102 may perform, by invoking the operation instruction stored in the memory 1103, the data processing methods in the embodiments shown in FIG. 5 to FIG. 7.

The controller 1102 may be a general-purpose processor, including a central processing unit (CPU), a network processor (NP), and the like. Alternatively, the controller 1102 may be a digital signal processor (DSP), an application specific integrated circuit (ASIC), a field-programmable gate array (FPGA), another programmable logic component, or the like.

The memory 1103 may include a random access memory (RAM), or may include a non-volatile memory (NVM), for example, at least one disk memory.

In the several embodiments provided in the present disclosure, it should be understood that the disclosed system, apparatus, and method may be implemented in other manners. For example, the described apparatus embodiment is merely an example. For example, the foregoing unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a RAM, a magnetic disk, or an optical disc.

The foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A data processing method implemented by a first storage device in a storage area network (SAN), comprising:
   receiving, from a host, a first reservation preemption command via a target port of the host, wherein the SAN comprises the first storage device and a second storage device, wherein the second storage device comprises a target logical unit (LU) that is identified by a logical unit number (LUN), wherein the first reservation preemption command comprises a port identifier of the target port, a to-be-checked reservation key, and the LUN of the target LU, and wherein the to-be-checked reservation key enables the second storage device to check the target port that sends the first reservation preemption command;
   determining, based on a preset port mapping relationship, a forwarding port of the first storage device that corresponds to the target port, wherein the preset port mapping relationship comprises a mapping relationship between the target port and the forwarding port;
   encapsulating the to-be-checked reservation key, the LUN, the port identifier of the target port, and a port identifier of the forwarding port to obtain a second reservation preemption command; and
   sending the second reservation preemption command to the second storage device using the forwarding port, wherein the second reservation preemption command instructs the second storage device to perform a reservation preemption operation based on checking a stored reservation key in reservation registration information of the target LU against the to-be-checked reservation key, and wherein the reservation registration information comprises a one-to-one correspondence between the target port and the stored reservation key.

2. The data processing method of claim 1, further comprising:
   obtaining the port identifier of the target port;
   selecting at least one port from ports establishing a correspondence with the target LU as the forwarding port;
   establishing a port mapping relationship between the forwarding port and the target port based on the port identifier of the target port;
   obtaining a reservation key stored in the target LU;
   generating a reservation registration command based on the port identifier of the forwarding port and a reservation key corresponding to the target port; and
   sending the reservation registration command to the target LU using the forwarding port, wherein the reservation registration command instructs the second storage device to record a correspondence between the reservation key corresponding to the target port and the forwarding port.

3. The data processing method of claim 2, further comprising:
   reading identification information of the target LU in the second storage device;
   creating a virtual LU based on the identification information; and
   mapping the virtual LU to a host port.

4. The data processing method of claim 3, further comprising:
   receiving an input/output (I/O) instruction from the host using the target port, wherein the I/O instruction is used to accesses the target LU using the virtual LU; and
   sending the I/O instruction to the target LU in the second storage device using the forwarding port.

5. The data processing method of claim 1, wherein all disk paths that directly couple the host to the second storage device are forbidden, and wherein the data processing method further comprises:
   receiving a reservation forwarding disabling instruction; and
   disabling a reservation forwarding function based on the reservation forwarding disabling instruction.

6. The data processing method of claim 1, wherein the SAN comprises a device interface, a coupling device, and a communication control protocol.

7. The data processing method of claim 6, wherein the device interface comprises a small computer system interface (SCSI) and a fiber channel.

8. The data processing method of claim 6, wherein the coupling device comprises at least one of a switch, a gateway, a router, or a hub.

9. The data processing method of claim 6, wherein the communication control protocol comprises either an Internet Protocol (IP) or a small computer system interface (SCSI) protocol.

10. A storage device, comprising:
    an interface for communicating with a target storage device; and
    a processor coupled to the interface and configured to:
        receive a first reservation preemption command from a host via a target port, wherein the first reservation preemption command comprises a port identifier of the target port of the host, a to-be-checked reservation key, and a logical unit number (LUN) of a target logical unit (LU), and wherein the to-be-checked reservation key enables the target storage device to check the target port that sends the first reservation preemption command from the host;
        determine a forwarding port of the storage device that corresponds to the target port based on a preset port mapping relationship, wherein the preset port mapping relationship comprises a mapping relationship between the target port and the forwarding port;

encapsulate the to-be-checked reservation key, the LUN, the port identifier of the target port, and a port identifier of the forwarding port to obtain a second reservation preemption command; and send the second reservation preemption command to the target storage device using the forwarding port, wherein the target storage device comprises the target LU, wherein the second reservation preemption command instructs the target storage device to perform a reservation preemption operation based on checking a stored reservation key in reservation registration information of the target LU against the to-be-checked reservation key, and wherein the reservation registration information comprises a one-to-one correspondence between the target port and the stored reservation key.

11. The storage device of claim 10, wherein before determining the forwarding port that corresponds to the target port, the processor is further configured to:

obtain the port identifier of the target port;

select at least one port from ports establishing a correspondence with the target LU as the forwarding port;

establish a port mapping relationship between the forwarding port and the target port based on the port identifier of the target port;

obtain a reservation key stored in the target LU;

generate a reservation registration command based on the port identifier of the forwarding port and a reservation key corresponding to the target port; and send the reservation registration command to the target LU using the forwarding port, wherein the reservation registration command instructs the target storage device to record a correspondence between the reservation key corresponding to the target port and the forwarding port.

12. The storage device of claim 11, wherein the processor is further configured to:

read identification information of the target LU in the target storage device;

create a virtual LU based on the identification information; and map the virtual LU to a host port.

13. The storage device of claim 12, wherein the processor is further configured to:

receive an input/output (I/O) instruction from the host using the target port, wherein the I/O instruction accesses the target LU using the virtual LU; and send the I/O instruction to the target LU in the target storage device using the forwarding port.

14. The storage device of claim 10, wherein all disk paths that directly couple the host to the target storage device are forbidden, and wherein the processor is further configured to:

receive a reservation forwarding disabling instruction; and disable a reservation forwarding function based on the reservation forwarding disabling instruction.

15. A data processing system, comprising:

a first storage device;

a second storage device coupled to the first storage device; and a host coupled to the first storage device and the second storage device and configured to send a first reservation preemption command to the first storage device via a target port of the host, wherein the first reservation preemption command comprises a port identifier of the target port, a to-be-checked reservation key, and a logical unit number (LUN), and wherein the to-be-checked reservation key enables the second storage device to check the target port that sends the first reservation preemption command from the host, wherein the second storage device is configured to:

receive a second reservation preemption command from the first storage device;

determine a target logical unit (LU) corresponding to the LUN;

search reservation registration information stored in the target LU for a target reservation key corresponding to the target port; and perform a reservation preemption operation based on checking a stored reservation key in reservation registration information of the target LU against the to-be-checked reservation key when the to-be-checked reservation key is consistent with the target reservation key, and wherein the reservation registration information comprises a one-to-one correspondence between the target port and the stored reservation key.

16. The data processing system of claim 15, wherein the first storage device is configured to:

receive the first reservation preemption command from the host using the target port;

determine based on a preset port mapping relationship, a forwarding port corresponding to the target port, wherein the preset port mapping relationship comprises a mapping relationship between the target port and the forwarding port;

encapsulate the to-be-checked reservation key, the LUN, the port identifier of the target port, and a port identifier of the forwarding port to obtain the second reservation preemption command; and send the second reservation preemption command to the second storage device using the forwarding port.

17. The data processing system of claim 16, wherein before determining the forwarding port corresponding to the target port, the first storage device is further configured to:

obtain the port identifier of the target port;

select at least one port from ports establishing a correspondence with the target LU of the second storage device as the forwarding port;

establish a port mapping relationship between the forwarding port and the target port based on the port identifier of the target port;

obtain a reservation key stored in the target LU;

generate a reservation registration command based on the port identifier of the forwarding port and the target reservation key corresponding to the target port; and send the reservation registration command to the target LU using the forwarding port, wherein the reservation registration command instructs the second storage device to record a correspondence between the target reservation key corresponding to the target port and the forwarding port.

18. The data processing system of claim 17, wherein before obtaining the reservation key stored in the target LU, the first storage device is further configured to:

read identification information of the target LU in the second storage device;

create a virtual LU based on the identification information; and map the virtual LU to a host port.

19. The data processing system of claim 18, wherein after sending the reservation registration command to the target LU, the first storage device is further configured to:
- receive an input/output (I/O) instruction from the host using the target port, wherein the I/O instruction accesses the target LU using the virtual LU; and
- send the I/O instruction to the target LU in the second storage device using the forwarding port.

20. The data processing system of claim 15, wherein all disk paths that directly couple the host to the second storage device are forbidden, and wherein the first storage device is further configured to:
- receive a reservation forwarding disabling instruction; and
- disable a reservation forwarding function based on the reservation forwarding disabling instruction.

* * * * *

UNITED STATES PATENT AND TRADEMARK OFFICE
CERTIFICATE OF CORRECTION

PATENT NO. : 10,712,947 B2
APPLICATION NO. : 16/257959
DATED : July 14, 2020
INVENTOR(S) : Haitao Zeng Page 1 of 1

It is certified that error appears in the above-identified patent and that said Letters Patent is hereby corrected as shown below:

In the Claims

Claim 4, Column 18, Line 28 & 29: "instructions is used to accesses" should read "instructions accesses"

Signed and Sealed this
Twenty-fifth Day of August, 2020

Andrei Iancu
*Director of the United States Patent and Trademark Office*